US009311153B2

(12) United States Patent
Kruglick

(10) Patent No.: US 9,311,153 B2
(45) Date of Patent: Apr. 12, 2016

(54) CORE AFFINITY BITMASK TRANSLATION

(71) Applicant: EMPIRE TECHNOLOGY DEVELOPMENT LLC, Wilmington (DE)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 130 days.

(21) Appl. No.: 14/124,569

(22) PCT Filed: May 15, 2013

(86) PCT No.: PCT/US2013/041196
§ 371 (c)(1),
(2) Date: Dec. 6, 2013

(87) PCT Pub. No.: WO2014/185906
PCT Pub. Date: Nov. 20, 2014

(65) Prior Publication Data
US 2014/0344550 A1    Nov. 20, 2014

(51) Int. Cl.
G06F 9/46 (2006.01)
G06F 9/50 (2006.01)

(52) U.S. Cl.
CPC ........ *G06F 9/5044* (2013.01); *G06F 2209/502* (2013.01)

(58) Field of Classification Search
None
See application file for complete search history.

(56) References Cited

U.S. PATENT DOCUMENTS 4,210,962 A    7/1980 Marsh et al.
4,916,659 A    4/1990 Persoon et al.
(Continued)

FOREIGN PATENT DOCUMENTS

EP    1736851 A2    12/2006
JP    H08315598 A    11/1996
(Continued)

OTHER PUBLICATIONS

"Can I programmatically pick and choose which core of a multi-core CPU my thread should run on?," Stackoverflow, accessed at http://stackoverflow.com/questions/1854709/can-i-programmatically-pick-and-choose-which-core-of-a-multi-core-cpu-my-thread, downloaded on Feb. 10, 2014, 2 pages.
(Continued)

*Primary Examiner* — Emerson Puente
*Assistant Examiner* — Mehran Kamran
(74) *Attorney, Agent, or Firm* — Moritt Hock & Hamroff LLP; Steven S. Rubin, Esq.

(57) ABSTRACT

Technologies are generally described for systems, methods, and devices related to core affinity bitmask translation. An example system may include first, second, third and fourth cores, and a dispatcher. The dispatcher may be configured to receive a first request where the first request include a core affinity bitmask and instructions. The core affinity bitmask can identify at least the first core and the second core. The dispatcher may be configured to determine a first affinity between the first core and the second core. The dispatcher may then identify the third core and the fourth core as having similar affinity to achieve a substantially similar performance. The dispatcher may also be configured to generate a second request that includes a translated core affinity bitmask. The translated core affinity bitmask may be effective to identify the third core and the fourth core as appropriate cores to execute the instructions.

19 Claims, 9 Drawing Sheets

(56) References Cited

U.S. PATENT DOCUMENTS

| | | | |
|---|---|---|---|
| 5,349,656 A | 9/1994 | Kaneko et al. | |
| 5,745,778 A | 4/1998 | Alfieri | |
| 5,806,059 A | 9/1998 | Tsuchida et al. | |
| 5,826,079 A | 10/1998 | Boland et al. | |
| 6,289,369 B1 | 9/2001 | Sundaresan | |
| 6,567,806 B1 | 5/2003 | Tsuchida et al. | |
| 6,658,448 B1 | 12/2003 | Stefaniak et al. | |
| 6,745,336 B1 | 6/2004 | Martonosi et al. | |
| 6,769,017 B1 | 7/2004 | Bhat et al. | |
| 6,782,410 B1 | 8/2004 | Bhagat et al. | |
| 7,093,258 B1* | 8/2006 | Miller et al. | 718/105 |
| 7,143,412 B2 | 11/2006 | Koenen | |
| 7,146,607 B2 | 12/2006 | Nair et al. | |
| 7,275,249 B1* | 9/2007 | Miller et al. | 718/105 |
| 7,363,523 B2 | 4/2008 | Kurts et al. | |
| 7,383,396 B2 | 6/2008 | Wyman | |
| 7,389,506 B1* | 6/2008 | Miller et al. | 718/1 |
| 7,437,581 B2 | 10/2008 | Grochowvski et al. | |
| 7,574,567 B2 | 8/2009 | Wyman | |
| 7,802,073 B1* | 9/2010 | Cheng et al. | 712/10 |
| 8,051,418 B1 | 11/2011 | Dice | |
| 8,078,832 B1 | 12/2011 | Agarwal et al. | |
| 8,108,843 B2 | 1/2012 | Nair et al. | |
| 8,181,169 B2 | 5/2012 | Nakaike et al. | |
| 8,214,817 B2 | 7/2012 | Mendelson et al. | |
| 8,443,341 B2 | 5/2013 | Berg et al. | |
| 2003/0018691 A1* | 1/2003 | Bono | 709/106 |
| 2003/0088608 A1* | 5/2003 | McDonald | 709/106 |
| 2003/0171907 A1 | 9/2003 | Gal-On et al. | |
| 2003/0236919 A1 | 12/2003 | Johnson et al. | |
| 2004/0181730 A1 | 9/2004 | Monfared et al. | |
| 2005/0154861 A1 | 7/2005 | Arimilli et al. | |
| 2005/0210472 A1 | 9/2005 | Accapadi et al. | |
| 2005/0246461 A1 | 11/2005 | Accapadi et al. | |
| 2006/0041599 A1 | 2/2006 | Tsuchida et al. | |
| 2006/0212677 A1* | 9/2006 | Fossum | 712/1 |
| 2006/0225074 A1 | 10/2006 | Vaid et al. | |
| 2006/0259800 A1 | 11/2006 | Maejima | |
| 2006/0265555 A1* | 11/2006 | Davis et al. | 711/147 |
| 2006/0293318 A1 | 12/2006 | Frei et al. | |
| 2007/0027972 A1 | 2/2007 | Agrawal et al. | |
| 2007/0044084 A1 | 2/2007 | Wang et al. | |
| 2007/0079308 A1 | 4/2007 | Chiaramonte et al. | |
| 2007/0124457 A1 | 5/2007 | May et al. | |
| 2007/0226752 A1 | 9/2007 | Davis et al. | |
| 2008/0046895 A1 | 2/2008 | Dillenberger et al. | |
| 2008/0126751 A1 | 5/2008 | Mizrachi et al. | |
| 2008/0178183 A1 | 7/2008 | Accapadi et al. | |
| 2008/0181283 A1 | 7/2008 | Elhanati et al. | |
| 2008/0229127 A1 | 9/2008 | Felter et al. | |
| 2009/0031317 A1 | 1/2009 | Gopalan et al. | |
| 2009/0031318 A1 | 1/2009 | Gopalan et al. | |
| 2009/0070553 A1 | 3/2009 | Wallach et al. | |
| 2009/0077562 A1 | 3/2009 | Sen et al. | |
| 2009/0125894 A1 | 5/2009 | Nair et al. | |
| 2009/0126006 A1 | 5/2009 | Zhang et al. | |
| 2009/0187915 A1 | 7/2009 | Chew et al. | |
| 2009/0249094 A1* | 10/2009 | Marshall et al. | 713/320 |
| 2009/0320031 A1* | 12/2009 | Song | 718/102 |
| 2010/0017804 A1 | 1/2010 | Gupta et al. | |
| 2010/0037222 A1 | 2/2010 | Tatsubori et al. | |
| 2010/0122101 A1 | 5/2010 | Naffziger et al. | |
| 2010/0191854 A1 | 7/2010 | Isci et al. | |
| 2010/0211735 A1* | 8/2010 | Sasakawa et al. | 711/114 |
| 2010/0225496 A1 | 9/2010 | Hou et al. | |
| 2011/0004692 A1 | 1/2011 | Occhino et al. | |
| 2011/0088021 A1 | 4/2011 | Kruglick | |
| 2011/0088022 A1 | 4/2011 | Kruglick | |
| 2011/0088038 A1* | 4/2011 | Kruglick | 718/104 |
| 2011/0088041 A1 | 4/2011 | Alameldeen et al. | |
| 2011/0093733 A1 | 4/2011 | Kruglick | |
| 2011/0161608 A1* | 6/2011 | Bellows et al. | 711/162 |
| 2011/0302585 A1 | 12/2011 | Dice | |
| 2012/0266179 A1* | 10/2012 | Osborn et al. | 718/105 |
| 2013/0017854 A1* | 1/2013 | Khawer | 455/522 |
| 2013/0103927 A1* | 4/2013 | Berry et al. | 712/30 |

FOREIGN PATENT DOCUMENTS

| | | | |
|---|---|---|---|
| JP | 2005085164 A | 3/2005 | |
| JP | 2006318380 A | 11/2006 | |
| JP | 2008543912 A | 5/2008 | |
| JP | 2008306522 A | 12/2008 | |

OTHER PUBLICATIONS

"Every Programmer Should Know These Latency Numbers," Dzone, accessed at http://web.archive.org/web/20130413014655/http://architects.dzone.com/articles/every-programmer-should-know, downloaded Feb. 10, 2014, 4 pages.

Intel Xeon Processor 7500 series Uncore Programming Guide, Intel, Reference No. 323535-001, Mar. 2010, Intel corporation, 146 pages.

"Take charge of processor affinity," IBM, asccessed at http://web.archive.org/web/20130119115223/http://www.ibm.com/developerworks/linux/library/I-affinity/index.html, Sep. 29, 2005, 9 pages.

"What's New in VMware vSphere 5.1?," VMware, Inc., Feb. 2013, 2 pages.

DG and EB., "Job to core binding," accessed at accessed at http://arc.liv.ac.uk/repos/hg/sge/doc/devel/rfe/job2core_binding_spec.txt, downloaded on Feb. 10, 2014, pp. 1-17.

Gilge, M., "IBM System Blue Gene Solution Blue Gene/Q Application Development," IBM, Jun. 12, 2013, 2 pages.

International Search Report with Written Opinion for International Application No. PCT/US2013/041196 mailed on Oct. 8, 2013, 26 pages.

"P6T New Era for Ultimate Performance! Intel® Core™ i7 Platform," accessed at http://www.asus.com/Motherboards/Intel_Socket_1366/P6T/, accessed on Sep. 24, 2015, pp. 4.

Albonesi, D.H, "Selective Cache Ways: On-Demand Cache Resource Allocation," Proceedings of the International Symposium on Microarchitecture, pp. 248-259 (Nov. 16-19, 1999).

Bala, V., et al., "Dynamo: A Transparent Dynamic Optimization System," Proceedings of Programming Language Design and Implementation, vol. 35, Issue 5, pp. 1-12 (May 2000).

Baraz, L., et al., "IA_32 Execution Layer: A Two-Phase Dynamic Translator Designed toSupport IA-32 Application on Itanium®-based Systems," Proceedings of the 36th International Symposium on Microarchitecture, pp. 1-11 (May 2003).

Brooks, D and Martonosi, M., "Dynamic Thermal Management for High-Performance Microprocessors" Proceedings of the 7th International Symposium on High Performance Computer Architecture, pp. 171-182 (Jan. 19-24, 2001).

Dehnert, J.C., et al., "The Transmeta Code Morphing™ Software: Using Speculation,Recovery, and Adaptive Retranslation to Address Real-Life Challenges," Proceedings of the InternationalSymposium on Code Generation and Optimization: Feedback-directed and Runtime, vol. 37, pp. 15-24 (Mar. 27-29, 2003).

Donald J., and Martonosi, M., "Techniques for Multicore Thermal Management: Classification and New Exploration" Proceedings of the 33rd Annual International Symposium on Computer Architecture, pp. 78-88 (2006).

Ebcioglu, K., et al., "DAISY: Dynamic Compilation for 100% Architectural Compatibility," Proceedings of the 24th International Symposium on Computer Architecture, vol. 25, Issue 2, pp. 26-37 (May 1997).

Flich, J et al., "On the Potential of Noc Virtualization for Multicore Chips," Scalable Computing: Practice and Experience, vol. 9, No. 3, pp. 165-177 (2008).

"HC23-S1: ManyCore," accessed at http://www.youtube.com/watch v=ZZ2nWq8UK5A&feature=player_detailpage#t=4674s, Apr. 2, 2012, pp. 2.

International Search Report dated Feb. 3, 2011 in International Application No.PCT/US2010/053110, 3 pages.

(56) References Cited

OTHER PUBLICATIONS

Kang, D-I., et al., "Preliminary Study toward Intelligent Run-time Resource Management Techniques for Large Multi-Core Architectures," pp. 1-2 (2007).

"Microsoft.Net Framework," accessed at http://web.archive.org/web/20131205081318/http://www.microsoft.com/net accessed on Sep. 24, 2015, p. 2.

Shirako, J et al., "Compiler Control Power Saving Scheme for Multi Core Processors," In Lecture Notes in Computer Science: Languages and Compilers for Parallel Computing, vol. 4339, Springer-Verlag, pp. 362-376 (2007).

Simon, CS 267: Applications of Parallel Computers Lecture 17: Parallel Sparse Matrix-Vector Multiplication; pp. 66; Oct. 22, 2002. http:/www.cs.berkeley.edu/-strive/cs267, available at http://www.powershow.com/view1/1f4d37-ZDc1ZCS__267__Applications__of__Parallel__Computers__Lecture__17__Parallel__Sparse__MatrixVector__Multiplication__powerpoint__ppt__presentation.

Song, F., et al, "Feedback-Directed Thread Scheduling with Memory Considerations," Proceedings of the 16th International Symposium on High Performance Distributed Computing, pp. 97-106 (Jun. 25-29, 2007).

Song, F., et al., "Analytical Modeling and Optimization for Affinity Based Tread Scheduling on Multicore Systems", IEEE International conference on cluster computing and workshops, pp. 1-10 (Aug. 31-Sep. 4, 2009).

\* cited by examiner

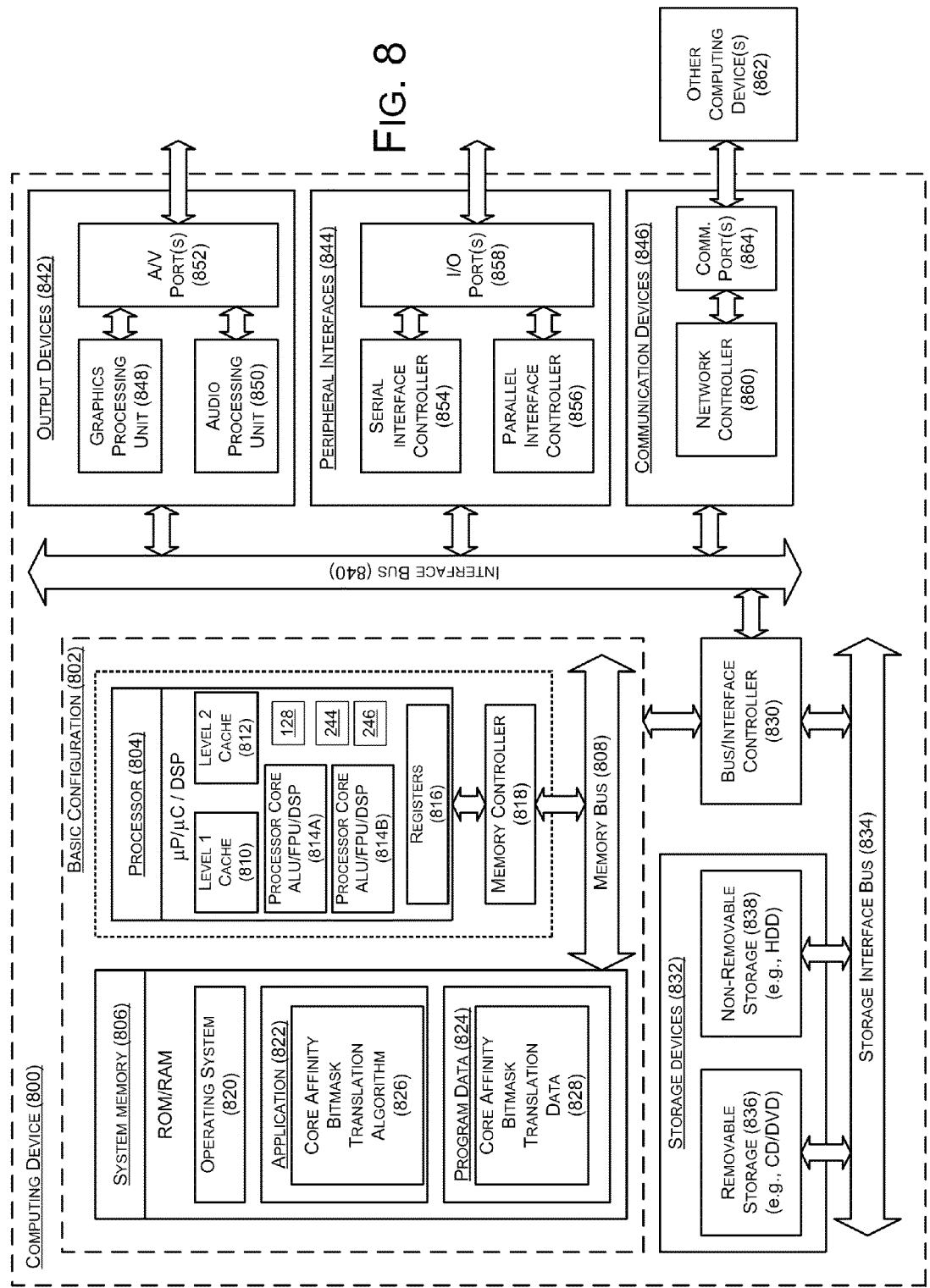

CORE AFFINITY BITMASK TRANSLATION

This application is a U.S. National Stage filing under 35 U.S.C. §371 of International Application No. PCT/US13/41196 filed May 15, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In multicore architectures, multiple processor cores may be included in a single integrated circuit die or on multiple integrated circuit dies that are arranged in a single chip package. Instructions may be received and executed by one or more cores in the chip. Memory may be shared by two or more processor cores in the chip.

SUMMARY

In some examples, methods for generating a translated core affinity bitmask for a multicore processor are generally described. The methods may include, by a dispatcher, receiving a first request. The first request may include a core affinity bitmask that identifies at least a first core and a second core of the multicore processor. The methods may include determining a first affinity between the first core and the second core. The methods may include, based at least in part on the first affinity, identifying a third core and a fourth core of the multicore processor. The methods may include generating a second request that includes the translated core affinity bitmask. The translated core affinity bitmask may identify the third core and the fourth core.

In some examples, devices effective to generate a translated core affinity bitmask of a multicore processor are generally described. The devices may include a memory and a device processor configured in communication with the memory. The device processor may be effective to receive a first request. The first request may include a core affinity bitmask. The core affinity bitmask may identify at least a first core and a second core of the multicore processor. The device processor may be effective to determine a first affinity between the first core and the second core. The device processor may be effective to, based at least in part on the first affinity, identify a third core and a fourth core of the multicore processor. The device processor may be effective to generate a second request that includes the translated core affinity bitmask. The translated core affinity bitmask may identify the third core and the fourth core.

In some examples, multicore processors are generally described. The multicore processors may include a first core, a second core, a third core, a fourth core, a memory, and a dispatcher. The memory may be configured in communication with the first core, the second core, the third core, and the fourth core. The dispatcher may be configured in communication with the first core, the second core, the third core, the fourth core, and the memory. The dispatcher may be effective to receive a first request. The first request may include a core affinity bitmask. The core affinity bitmask may identify at least the first core and the second core of the multicore processor. The dispatcher may be effective to determine that the first core is at least partially inoperative. The dispatcher may be effective to determine a first affinity between the first core and the second core. The dispatcher may be effective to, based at least in part on the first affinity, identify a third core and a fourth core of the multicore processor. The dispatcher may be effective to generate a second request that includes the translated core affinity bitmask. The translated core affinity bitmask may identify the third core and the fourth core.

In some examples, methods for generating a translated core affinity bitmask for a multicore processor are generally described. The methods may include, by a dispatcher, receiving a first request to execute a first task on a first core and a second task on a second core. The first request may include a core affinity bitmask that identifies at least the first core and the second core of the multicore processor. The methods may include determining a first property of the first core. The methods may include determining that the first core is at least partially inoperative. The methods may include, based on the determination that the first core is at least partially inoperative, identifying a third core of the multicore processor, where the third core has the first property. The methods may include generating a second request that includes the translated core affinity bitmask. The translated core affinity bitmask may identify the second core and the third core so that the first task is executed on the third core and the second task is executed on the second core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a block diagram illustrating an example computing device that is arranged to implement core affinity bitmask translation, all arranged according to at least some embodiments described herein.

DETAILED DESCRIPTION

Figure 1:
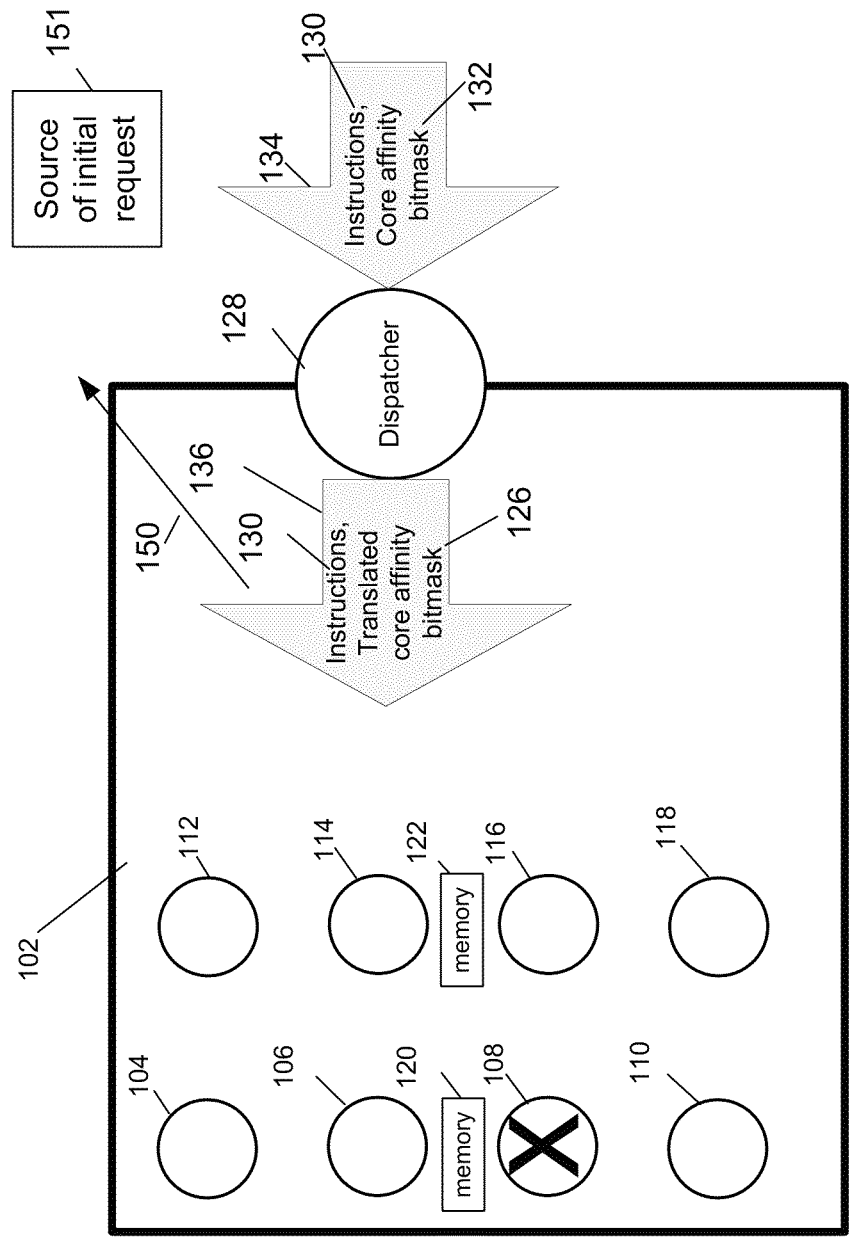
FIG. 1 illustrates an example system that can be utilized to implement core affinity bitmask translation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to methods, apparatus, systems, devices, and computer program products related to core affinity bitmask translation.

Briefly stated, technologies are generally described for systems methods, and devices related to core affinity bitmask translation. An example system may include first, second, third and fourth cores, and a dispatcher. The dispatcher may be configured to receive a first request where the first request includes a core affinity bitmask and instructions. The core affinity bitmask can identify at least the first core and the second core. The dispatcher may be configured to determine a first affinity between the first core and the second core. The dispatcher may then identify the third core and the fourth core as having similar affinity to achieve a substantially similar performance. The dispatcher may also be configured to generate a second request that includes a translated core affinity bitmask. The translated core affinity bitmask may be effective to identify the third core and the fourth core as appropriate cores to execute the instructions.

FIG. 1 illustrates an example system 100 that can be utilized to implement core affinity bitmask translation in accordance with at least some embodiments described herein. An example system 100 may include two or more processor cores 104, 106, 108, 110, 112, 114, 116 and/or 118 of a multicore processor 102. Cores 104, 106, 108, 110, 112, 114, 116 and/or 118 may be capable of operating at the same or different operating frequencies. Cores 104, 106, 108, 110, 112, 114, 116 and/or 118 may be capable of executing instructions from the same instruction set or from different instruction sets. Some of the cores may be configured in communication with a memory 120 or a memory 122. In some examples, memories 120, 122 may be cache memory or random access memory such as DDR (double data rate) memory. At least one of cores 104, 106, 108, 110, 112, 114, 116 and/or 118 may become at least partially inoperative as is illustrated by the "X" in core 108 in FIG. 1. For example, core 108 may have stopped operating or stopped operating within a requested specification such as operating at a lower frequency or at a reduced communication speed then specified. For example, core 108 may become inoperative because of an overheating (as may occur with a thermal hotspot), a hardware error, a fabrication error, an inability to operate at a target voltage, a latchup, or other cause. As described in more detail below, a dispatcher 128 may be configured to receive an initial request 134 from a source of initial request 151. Dispatcher 128 may comprise a device and may include a device processor, and may include and/or be in communication with, a memory with instructions. Initial request 134 may include one or more instructions 130 and a core affinity bitmask 132. Instructions 130 may be instructions to be processed by multicore processor 102. Core affinity bitmask 132 may identify certain cores on multicore processor 102 to execute instructions 130. In one example, a software program that generates instructions 130 may also generate core affinity bitmask 132, where the software program requests that instruction 130 be executed on certain cores identified by the core affinity bitmask 132. Example software programs may include multicore aware high performance software, such as database software, computational analysis software, streaming software, among others. Core affinity bitmask 132 may identify one or more cores. The identified cores may have a particular affinity that may be determined as is described in more detail below. An example affinity may be, for example, cores with shared operating characteristics or cores within a certain proximity of a memory. An example core affinity bitmask 132 may be implemented, for example, as a set of bits. The set of bits may be a binary set of bits, a set of compressed bits, a set of encoded bits, or some other variety of bits depending on the desired implementation. In one example, a first bit value in the bits may indicate that a particular core is requested by instructions 130 and a second bit value in the bits may indicate that the particular core is not requested by instructions 130.

Dispatcher 128 may be implemented as part of multicore processor 102 or separate from multicore processor 102. Dispatcher 128 may be implemented using hardware, software, or a combination of hardware and software. Dispatcher 128 may be configured to receive initial request 134 and generate a translated request 136. Translated request 136 may include instructions 130 and may further include a translated core affinity bitmask 126. Instructions 130 may be executed on cores identified in translated core affinity bitmask 126.

Translated core affinity bitmask 126 may identify a group of cores on multicore processor 102. The group of cores in translated core affinity bitmask 126 may be same or different from the group of cores in core affinity bitmask 132. A message 150 may be generated by dispatcher 128. Message 150 may identify the cores in translated core affinity bitmask 126. Message 150 may be sent to source of initial request 151 when the translated core affinity bitmask 126 includes a group of cores different from the group of cores identified in the core affinity bitmask 132. Message 150 may be used to identify additional cores in examples when cores in translated core affinity bitmask 126 are insufficient to provide a requested performance level for instructions 130.

Figure 2:
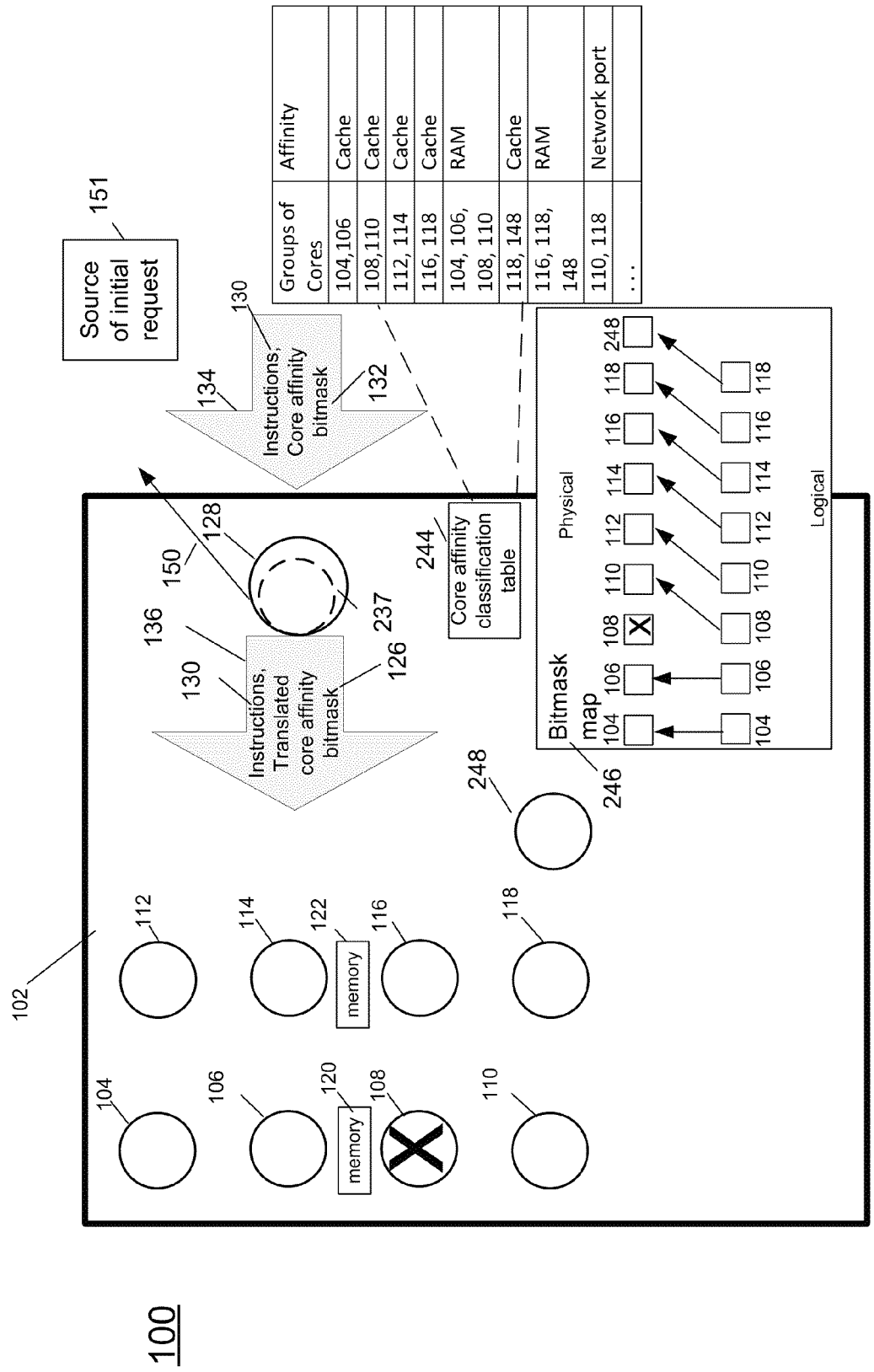
FIG. 2 illustrates the example system that can be utilized to implement the core affinity bitmask translation of FIG. 1 with additional details relating to a core affinity classification table.
Figure 3:
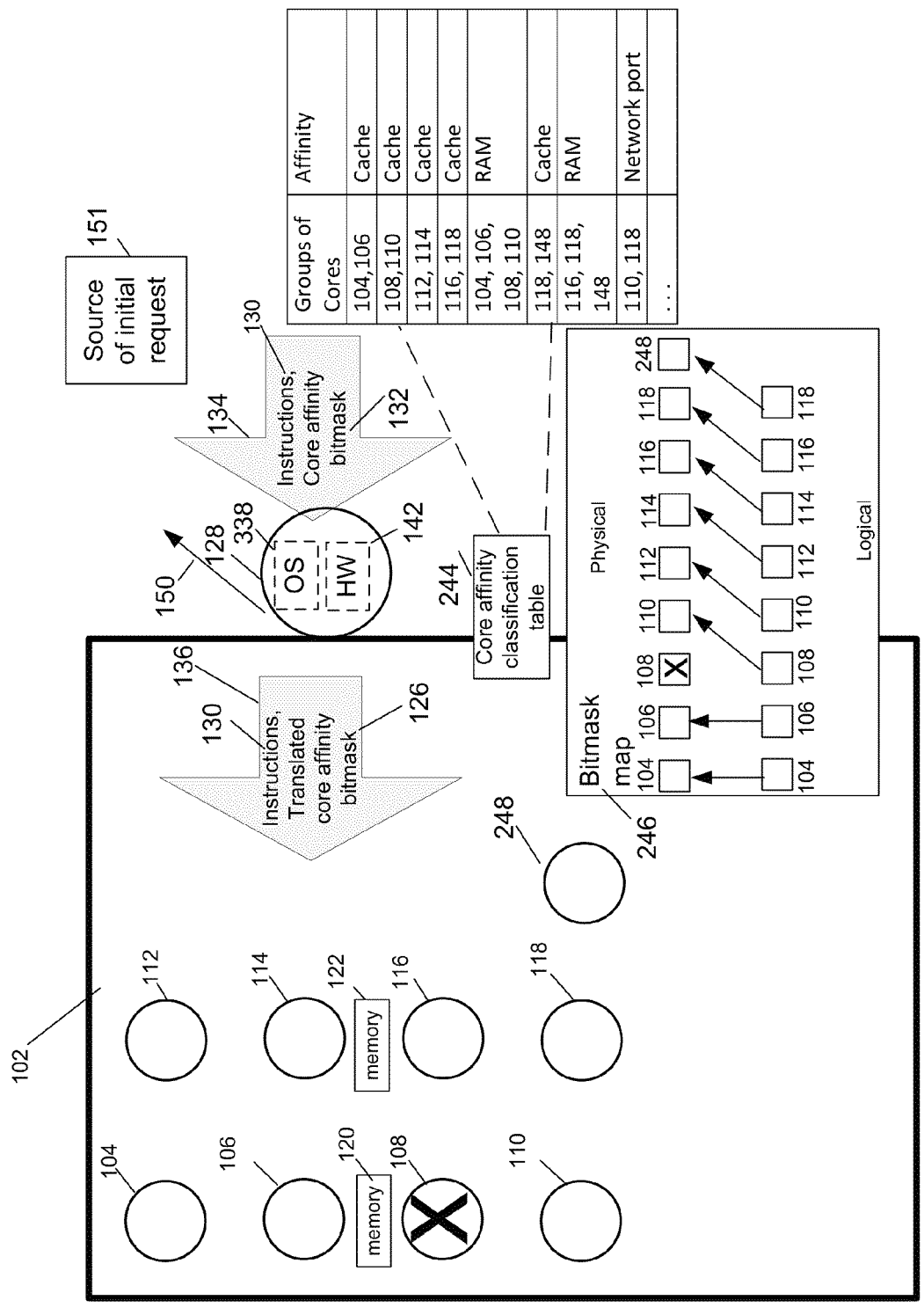
FIG. 3 illustrates the example system that can be utilized to implement the core affinity bitmask translation of FIG. 1 with additional details relating to a core affinity classification table.

FIGS. 2 and 3 illustrate example systems that can be utilized to implement core affinity bitmask translation of FIG. 1 with additional details relating to a core affinity classification table, arranged in accordance with at least some embodiments described herein. Those components in FIGS. 2 and 3 that are labeled identically to components of FIG. 1 will not be described again for the purposes of clarity. FIG. 2 illustrates dispatcher 128 inside or as part of multicore processor 102. FIG. 3 illustrates dispatcher 128 outside multicore processor 102. Aside from the placement of dispatcher 128, FIGS. 2 and 3 are otherwise the same and discussion below will refer to either figure except where the location of dispatcher 128 is specified.

In some examples, dispatcher 128 may be implemented in hardware in multicore processor 102. In other examples, dispatcher 128 may be implemented on another processor core 237 on multicore processor 102 as shown in the example in FIG. 2. In other examples, dispatcher 128 may be implemented in software such as by an operating system ("OS") 338 as shown in the example in FIG. 3. Dispatcher 128 may be implemented as hardware ("HW") 142 outside of multicore processor 102 such as in a hypervisor as shown in the example in FIG. 3. With reference to FIG. 2, a redundant core 248 may be disposed in multicore processor 102. Redundant core 248 may be used in examples when a core, such as core 108, becomes at least partially inoperative—as is described in more detail below.

A core affinity classification table 244 may be stored in a memory or hardware configured to be in communication with dispatcher 128. Core affinity classification table 244 may be located in multicore processor 102 or outside of multicore processor 102. Core affinity translation table 244 may be stored in a memory, as hardware such as a part of logic hardware, in a hypervisor, or in operating system 338 (FIG. 3). Core affinity classification table 244 may be for example, a finite state machine.

Core affinity classification table 244 may identify groups of cores and one or more affinities between or among cores in the respective groups. For example, table 244 may indicate that a particular group of cores have an affinity where the cores share a common DDR3 memory interface. In another example, table 244 may indicate that a particular group of cores have an affinity where the cores share a cache and a network port. In examples where core affinity bitmask 132 identifies the particular group, core affinity classification table 244 may indicate that the corresponding affinity between or among cores in the particular group is an affinity with a common DDR3 memory interface. In another example, if two physically adjacent cores are requested in core affinity bitmask 132, then the identified affinity between the cores may be that the cores share an affinity to a commonly shared cache. In another example, if core affinity bitmask 132 identifies a group of cores associated with a shared network port, then the cores share an affinity to a commonly shared network port. In various examples, the affinity may indicate a shared memory bus, or a common level of cache, shared accelerator, etc. In some additional examples, multiple affinities among a group of cores may be identified.

Cores of multicore processor 102 may be identified by physical core identification numbers. Further, cores of multicore processor 102 may also be identified by logical core identification numbers. In some examples, multicore processor 102 may provide the logical identification numbers to a hypervisor or an operating system under execution on system 100. A correspondence between logical core identification numbers and physical cores (as identified by physical core identification numbers) may be stored in a bitmask map 246. Bitmask map 246 may be stored in dispatcher 128 or elsewhere on multicore processor 102 such as being set at a factory during chip test, set during a power on test, or at another time during active functions. Logical core identification numbers may correspond to logical representations of physical cores. Each physical core identification number may correspond to a core of multicore processor 102. When a physical core becomes at least partially inoperative, bitmask map 246 may map the corresponding logical core identification number to a different physical core identification number corresponding to another physical core of multicore processor 102. For example, if core 108 is inoperative, logical identification number 108 may be mapped to physical core identification number 110 corresponding to core 110 of multicore processor 102. As is explained in more detail below, bitmask map 246 may be used to indicate when cores have become at least partially inoperative. Bitmask map 246 may be located in multicore processor 102 or outside of multicore processor 102. For example, a piece of hardware external to multicore processor 102 may store bitmask map 246 for a group of processors.

In an example, dispatcher 128 may receive initial request 134. Initial request 134 may include core affinity bitmask 132. Core affinity bitmask 132 may indicate that multicore processor 102 should execute instructions 130 on a particular set of cores. Core affinity bitmask 132 may include logical identification numbers for the particular set of cores. Dispatcher 128 may process initial request 134 by analyzing bitmask map 246, and identifying physical cores that correspond to the logical core identification numbers in core affinity bitmask 132.

In an example, core affinity bitmask 132 may include the logical identification number corresponding to core 110. Dispatcher 128 may analyze bitmask map 246 to determine that logical core identification number 110 is mapped to physical core identification number 110. In another example, bitmask map 246 may indicate that logical core identification number 110 is mapped to a different physical core identification number.

When all cores in multicore processor 102 are operative, a default bitmask map 246 may include a map that relates identification numbers associated with logical cores to the same identification numbers associated with physical cores (e.g. logical core 108 may be mapped to physical core 108). In examples when core 108 is at least partially inoperative, bitmask map 246 may provide a map that is different from a default bitmask map to exclude the inoperative core. For example, logical core 108 may be mapped to physical core 110—as is shown in the example in FIGS. 2 and 3.

In the example bitmask map shown in FIGS. 2 and 3, core 108 is indicated as being at least partially inoperative as illustrated by an "X". Bitmask map 246 may include a map that associates (or maps) the identifications of logical cores to the identifications of physical cores so as to prevent use of the partially inoperative core. In one example, bitmask map 246 may provide a mapping of logical to physical cores that is unrelated to an affinity of cores in multicore processor 102. For example, bitmask map 246 may map an identification of redundant core 248 to an identification of another logical core and map an identification of partially inoperative core 108 to an identification of an unused logical core.

In an example, dispatcher 128 may receive an initial request 134 that includes a core affinity bitmask 132. Dispatcher 128 may analyze bitmask map 246 to determine whether bitmask map 246 is different from a default bitmask map. If the bitmask map is different from the default bitmask map, the difference may indicate that one of the cores in multicore processor 102 is partially inoperative.

In examples where the bitmask map is different from the default bitmask map, dispatcher 128 may determine that a core may be at least partially inoperative. Dispatcher 128 may analyze bitmask map 246 to identify the at least partially inoperative core. Dispatcher 128 may determine whether the partially inoperative core is requested in core affinity bitmask 132. In an example, if the at least partially inoperative core is not requested in core affinity bitmask 132, then translated core affinity bitmask 126 may identify the same physical cores as core affinity bitmask 132 because there may be no defective core to map around. In this example, where the at least partially inoperative core is not requested in core affinity bitmask 132, cores identified in core affinity bitmask 132 may still be identified in translated core affinity bitmask 126 even though one of the cores in multicore processor 102 is at least partially inoperative.

In an example, if physical core 108 is inoperative, bitmask map 246 may shift a mapping of logical core identification numbers to physical core identification numbers. In the example shown in FIGS. 2 and 3, as a result of the shift, logical core identification number 108 is mapped to physical core identification number 110, and logical core identification number 110 is mapped to physical core identification number 112. In examples where physical core 108 is not requested in core affinity bitmask 132, mapping of logical core identification numbers to different physical core identification numbers (e.g. logical core 108 being mapped to physical core 110) may result in instructions being processed by physical cores without a requested affinity. In response to a determination that physical core 108 is not requested in core affinity bitmask 132, dispatcher 128 may modify core affinity bitmask 132 or modify a result of an analysis of bitmask map 246, so that translated core affinity bitmask 126 identifies the same physical cores as core affinity bitmask 132.

In examples where the at least partially inoperative core is identified in core affinity bitmask 132, dispatcher 128 may analyze core affinity classification table 244. Dispatcher 128 may analyze core affinity classification table 244 based on core affinity bitmask 132 to determine a first affinity of cores identified in core affinity bitmask 132. In examples where the first affinity is determined, dispatcher 128 may analyze core affinity translation table 244 to identify another group of available cores with substantially the same affinity as the first affinity. In some examples, if more than one affinity for cores in core affinity bitmask 132 is identified, dispatcher 128 may analyze core affinity translation table 244 to identify another group of available cores with as many of the same affinities as is possible. In some examples, if more than one affinity for cores in core affinity bitmask 132 is identified, dispatcher 128 may analyze core affinity translation table 244 to identify another group of available cores that have the same affinities in a priority order of affinities. In one example, if the identified affinities are cache affinity and memory affinity, dispatcher 128 may identify another group of available cores that have both cache affinity and memory affinity. If no such group of cores is available, dispatcher 128 may choose a group of available cores that have cache affinity. In examples where the affinity for cores in core affinity bitmask 132 is not determined, or no group of cores with the determined affinity are available, dispatcher 128 may use bitmask map 246 to generate translated core affinity bitmask 126 such that translated core affinity bitmask 126 does not identify an inoperative core.

In an example, core affinity bitmask 132 may identify cores 104 and 106. Dispatcher 128 may analyze bitmask map 246 and determine that both physical cores 104 and 106 are functional. Dispatcher 128 may then generate a translated core affinity bitmask 126 that may identify cores 104 and 106.

In an example, core affinity bitmask 132 may identify cores 108 and 110. Dispatcher 128 may analyze bitmask map 246 and determine that physical core 108 is at least partially inoperative. Dispatcher 128 may analyze core affinity classification table 244 to determine an affinity of cores 108 and 110. In the example, core affinity classification table 244 may indicate that the group of cores 108 and 110 has an affinity that the cores share the same cache. Dispatcher 128 may analyze core affinity classification table 244 to identify another group of cores with the same affinity—that of sharing the same cache. In the example, dispatcher 128 may identify group of cores 104 and 106 as having the same affinity. Dispatcher 128 may then generate translated core affinity bitmask 126 that may identify physical cores 104 and 106. Dispatcher 128 may generate multiple different translated core affinity bitmasks and select one of the generated translated core affinity bitmasks based on an availability of the cores.

Figure 4:
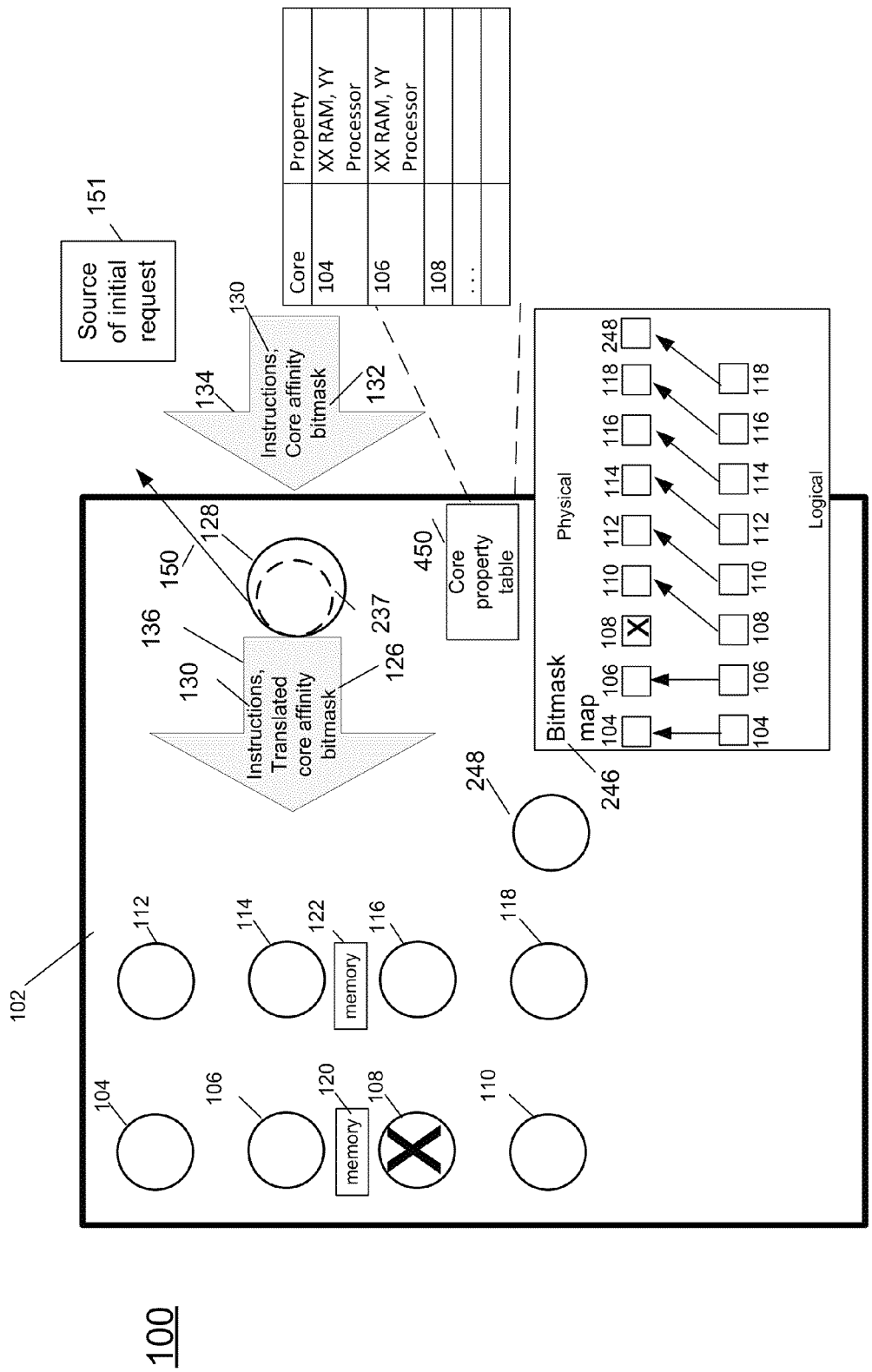
FIG. 4 illustrates the example system that can be utilized to implement the core affinity bitmask translation of FIG. 1 with additional details relating to a core property table.
Figure 5:
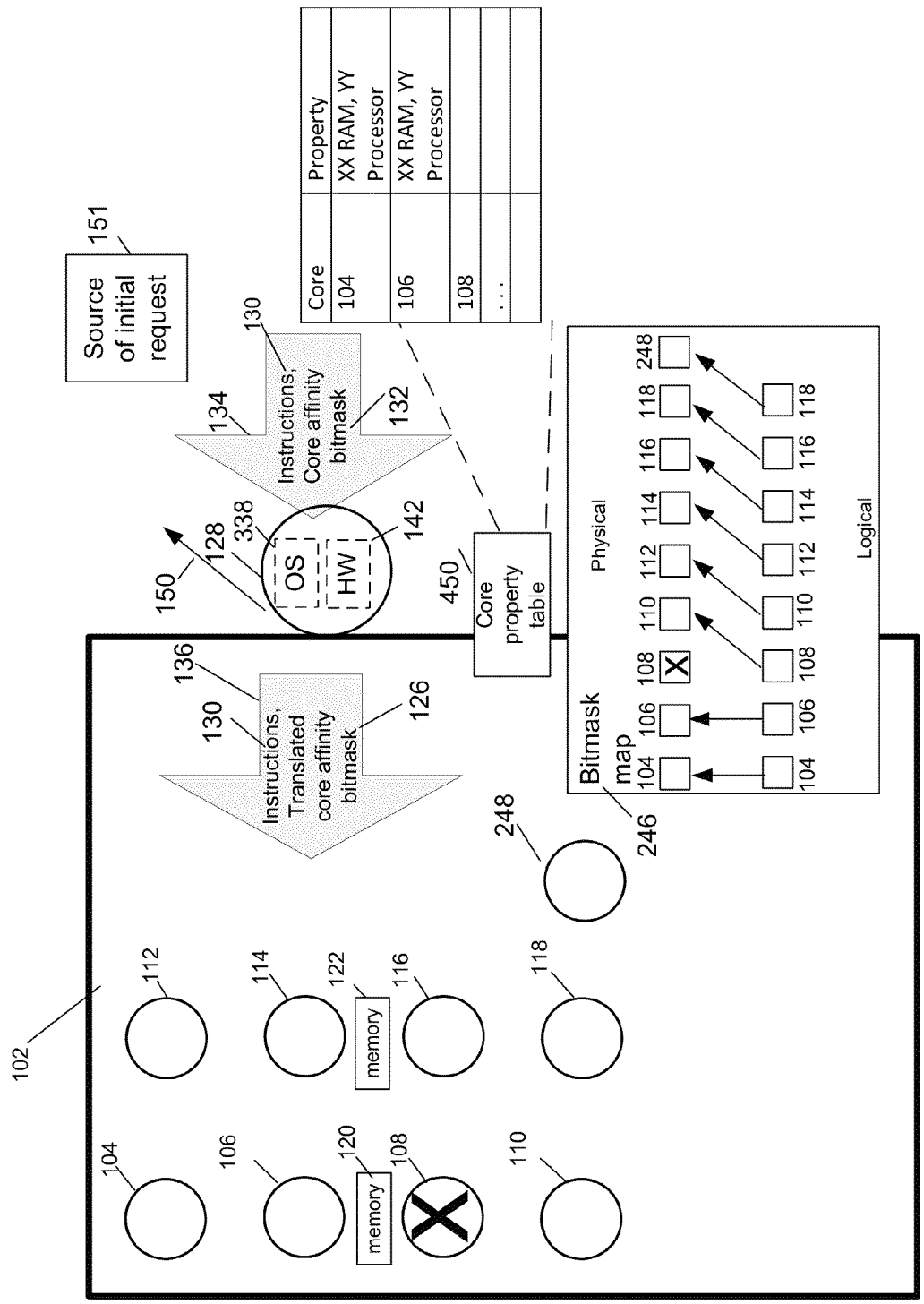
FIG. 5 illustrates the example system that can be utilized to implement the core affinity bitmask translation of FIG. 1 with additional details relating to a core property table.

FIGS. 4 and 5 illustrate example systems that can be utilized to implement core affinity bitmask translation of FIG. 1 with additional details relating to a core affinity property table, arranged in accordance with at least some embodiments described herein. Those components in FIGS. 4 and 5 that are labeled identically to components of FIG. 1, 2 or 3 will not be described again for the purposes of clarity. FIG. 4 illustrates dispatcher 128 inside or as part of multicore processor 102. FIG. 5 illustrates dispatcher 128 outside multicore processor 102. Aside from the placement of dispatcher 128, FIGS. 4 and 5 are otherwise the same and discussion below will refer to either figure except where the location of dispatcher 128 is specified.

A core property table 450 may be stored in a memory or hardware configured to be in communication with dispatcher 128. Core property table 450 may be located in multicore processor 102 or outside of multicore processor 102. Core property table 450 may be stored in a memory, as hardware such as a part of logic hardware, in a hypervisor, or in operating system 338 (FIG. 5). Core property table 450 may be for example, a finite state machine.

Core property table 250 may identify cores and one or more properties of the respective cores. For example, core property table 450 may indicate that a particular core has a property where the core has a particular amount of RAM or a particular processor speed. In another example, core property table 450 may identify cores with equivalent properties. For example, table 450 may indicate that cores 104 and 106 are equivalent because cores 104 and 106 have the same or substantially the same properties. In examples where core affinity bitmask 132 identifies a particular core, core property table 450 may indicate a corresponding property of the core. In various examples, the property may indicate access to a memory bus, a size of cache, RAM, other memory, processor speed, access to an accelerator, etc.

In an example, dispatcher 128 may receive initial request 134. For example, initial request 134 may indicate that a first task should be executed on a first core and second task should be executed on a second core. Initial request 134 may include core affinity bitmask 132. Core affinity bitmask 132 may indicate that multicore processor 102 should execute instructions 130 on a particular set of cores. Core affinity bitmask 132 may include logical identification numbers for the particular set of cores. Dispatcher 128 may process initial request 134 by analyzing bitmask map 246, and identifying physical cores that correspond to the logical core identification numbers in core affinity bitmask 132.

In an example, dispatcher 128 may receive an initial request 134 that includes a core affinity bitmask 132. Dispatcher 128 may analyze bitmask map 246 to determine whether bitmask map 246 is different from a default bitmask map. If the bitmask map is different from the default bitmask map, the difference may indicate that one of the cores in multicore processor 102 is partially inoperative.

In examples where the bitmask map is different from the default bitmask map, dispatcher 128 may determine that a core may be at least partially inoperative. Dispatcher 128 may analyze bitmask map 246 to identify the at least partially inoperative core. Dispatcher 128 may determine whether the partially inoperative core is requested in core affinity bitmask 132. In an example, if the at least partially inoperative core is not requested in core affinity bitmask 132, then translated core affinity bitmask 126 may identify the same physical cores as core affinity bitmask 132 because there may be no defective core to map around. In this example, where the at least partially inoperative core is not requested in core affinity bitmask 132, cores identified in core affinity bitmask 132 may still be identified in translated core affinity bitmask 126 even though one of the cores in multicore processor 102 is at least partially inoperative.

In an example, if physical core 108 is inoperative, bitmask map 246 may shift a mapping of logical core identification numbers to physical core identification numbers. In the example shown in FIGS. 4 and 5, as a result of the shift, logical core identification number 108 is mapped to physical core identification number 110, and logical core identification number 110 is mapped to physical core identification number 112. In examples where physical core 108 is not requested in core affinity bitmask 132, mapping of logical core identification numbers to different physical core identification numbers (e.g. logical core 108 being mapped to physical core 110) may result in instructions being processed by physical cores without a requested affinity. In response to a determination that physical core 108 is not requested in core affinity bitmask 132, dispatcher 128 may modify core affinity bitmask 132 or modify a result of an analysis of bitmask map 246, so that translated core affinity bitmask 126 identifies the same physical cores as core affinity bitmask 132.

In examples where the at least partially inoperative core is identified in core affinity bitmask 132, dispatcher 128 may analyze core property table 250. Dispatcher 128 may analyze core affinity classification table 250 based on core affinity bitmask 132 to determine respective properties of cores identified in core affinity bitmask 132. In examples where the properties are determined, dispatcher 128 may analyze core property table 250 to identify other cores with substantially the same properties. In one example, if the identified property relates to cache size, dispatcher 128 may identify another core that has substantially the same cache size as the requested core in core affinity bitmask 132. If no such core is available, dispatcher 128 may choose a core with properties closest to the requested core.

In an example, request 134 may identify cores 108 and 110 to execute first and second tasks respectively. Dispatcher 128 may analyze bitmask map 246 and determine that physical core 108 is at least partially inoperative. Dispatcher 128 may analyze core property table 250 to determine a property of core 108. In the example, core property table 250 may indicate that core 108 has a property relating to RAM size. Dispatcher 128 may analyze core property table 250 to identify another core with the same or substantially the same property—that of RAM size. In the example, dispatcher 128 may identify cores 108 and 106 as having the same or substantially the same property. Dispatcher 128 may then generate translated core affinity bitmask 126 so that the second task is assigned to core 110 and the first task is assigned to core 106.

Among other possible benefits, a system arranged in accordance with the present disclosure may allow instructions to be executed by cores with a specified affinity or an approximation of the specified affinity, even if one or more cores is at least partially inoperative. An affinity of identified cores may be determined and instructions may be sent to a group of cores with the same affinity. More predictable performance for multicore aware software may be achieved in part because instructions requesting a bitmask with cores of a particular affinity may be executed with the requested affinity even in examples when a core is partially inoperative or unavailable. Inoperative cores may be inoperative due to permanent failure or transient failure (e.g. a thermal hotspot). Unavailable cores may be busy processing other tasks.

Figure 6A:
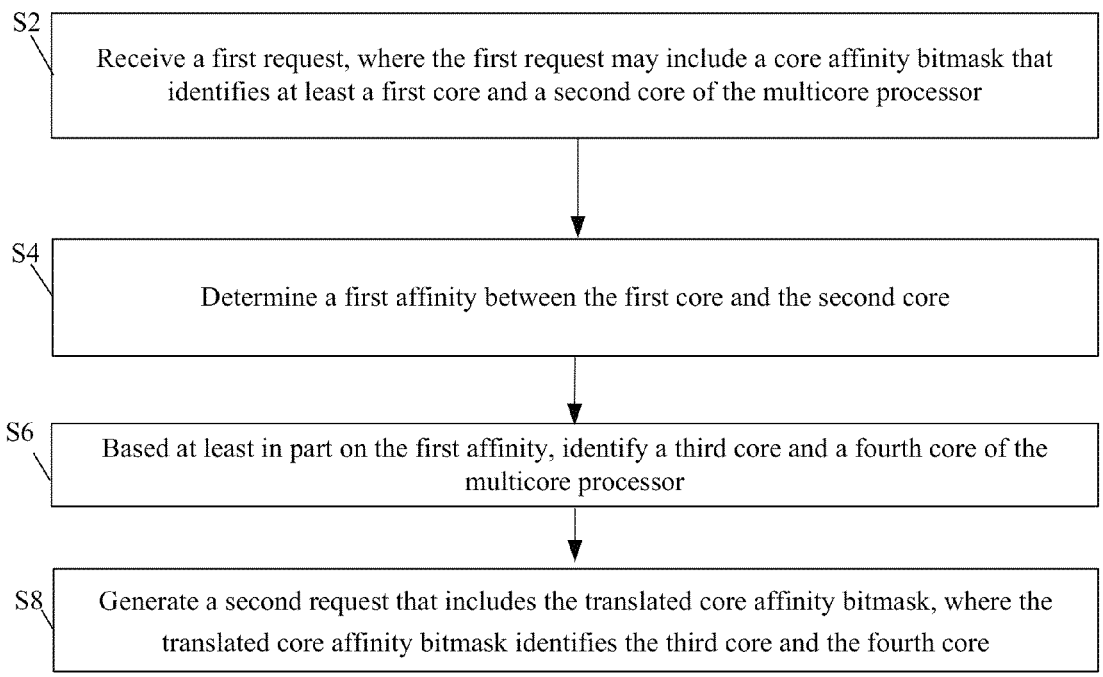
FIG. 6A depicts a flow diagram for an example process for implementing core affinity bitmask translation.

FIG. 6A depicts a flow diagram for an example process for implementing core affinity bitmask translation arranged in accordance with at least some embodiments described herein. In some examples, the process in FIG. 6A could be implemented using system 100 discussed above to implement a method for generating a translated core affinity bitmask for a multicore processor by a dispatcher.

An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Processing may begin at block S2, "Receive a first request, where the first request may include a core affinity bitmask that identifies at least a first core and a second core of the multi-core processor." In some examples, at block S2, a dispatcher may receive a request that includes a core affinity bitmask. The core affinity bitmask may identify a first and second core of a multicore processor.

Processing may continue from block S2 to block S4, "Determine a first affinity between the first core and the second core." At block S4, the dispatcher may determine an affinity between the first core and the second core. The dispatcher may determine the first affinity by determining that the first and second core are part of a group of cores in the core affinity translation table where the table includes groups of cores with a corresponding affinity.

Processing may also continue from block S4 to block S6, "Based at least in part on the first affinity, identify a third core and a fourth core of the multicore processor." At block S6, the dispatcher, based on the first affinity, may identify a third core and a fourth core of the multicore processor. Identifying the third and fourth core may include determining a second affinity between the third and the fourth core that is substantially the same as the first affinity. In some examples, identifying the third and fourth core may include determining a second affinity between the third and the fourth core that is not substantially the same as the first affinity. The dispatcher may identify the third core and fourth core in response to a determination that the first core is at least partially inoperative by determining that a current bitmask map of the processor is different from a default bitmask map of the processor.

Processing may continue from block S6 to block S8, "Generate a second request that includes the translated core affinity bitmask, where the translated core affinity bitmask identifies the third core and the fourth core." At block S8, the dispatcher may generate a second request that includes the translated core affinity bitmask. The translated core affinity bitmask may identify the third core and the fourth core.

Figure 6B:
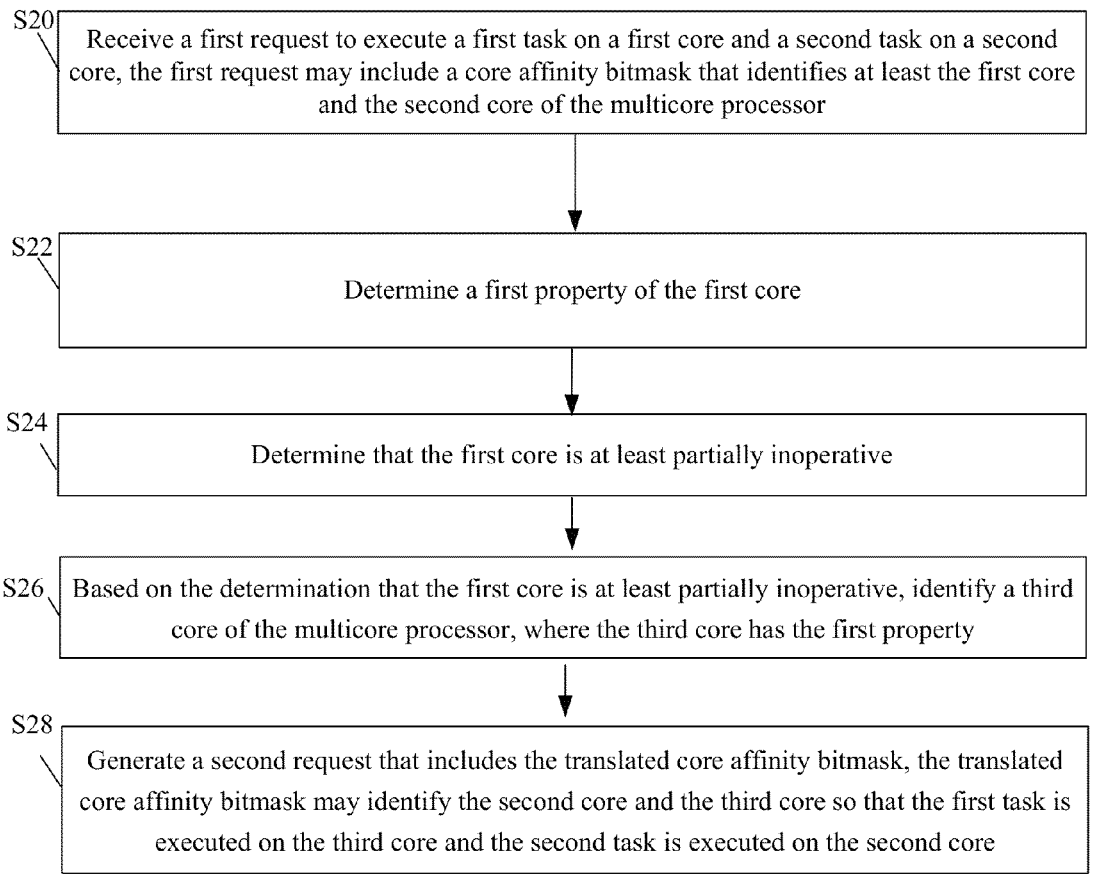
FIG. 6B depicts a flow diagram for an example process for implementing core affinity bitmask translation.

FIG. 6B depicts a flow diagram for an example process for implementing core affinity bitmask translation arranged in accordance with at least some embodiments described herein. In some examples, the process in FIG. 6B could be implemented using system 100 discussed above to implement a method for generating a translated core affinity bitmask for a multicore processor by a dispatcher.

An example process may include one or more operations, actions, or functions as illustrated by one or more of blocks S20, S22, S24, S26 and/or S28. Although illustrated as discrete blocks, various blocks may be divided into additional blocks, combined into fewer blocks, or eliminated, depending on the desired implementation.

Processing may begin at block S20, "Receive a first request to execute a first task on a first core and a second task on a second core, the first request may include a core affinity bitmask that identifies at least the first core and the second core of the multicore processor." At block S20, a dispatcher may receive a first request. The first request may be a request to execute a first task on a first core and a second task on a second core. The request may include a core affinity bitmask that identifies at least the first core and the second core of a multicore processor.

Processing may continue from block S20 to block S22, "Determine a first property of the first core." At block S22, the dispatcher may determine a first property of the first core. The dispatcher may determine the first property by analyzing a core property table.

Processing may continue from block S22 to block S24, "Determine that the first core is at least partially inoperative." The dispatcher may determine that the first core is at least partially inoperative by determining that a current bitmask map of the processor is different from a default bitmask map of the processor.

Processing may continue from block S24 to block S26, "Based on the determination that the first core is at least partially inoperative, identify a third core of the multicore processor, where the third core has the first property." At block S26, the dispatcher may identify a third core that has the first property.

Processing may continue from block S26 to block S28, "Generate a second request that includes the translated core affinity bitmask, the translated core affinity bitmask may identify the second core and the third core so that the first task is executed on the third core and the second task is executed on the second core." At block S28, the dispatcher may generate a second request that includes the translated core affinity bitmask. The translated core affinity bitmask may identify the second core and the third core. The translated core affinity bitmask and second request may be used so that the first task is executed on the third core and the second task is executed on the second core.

Figure 7:
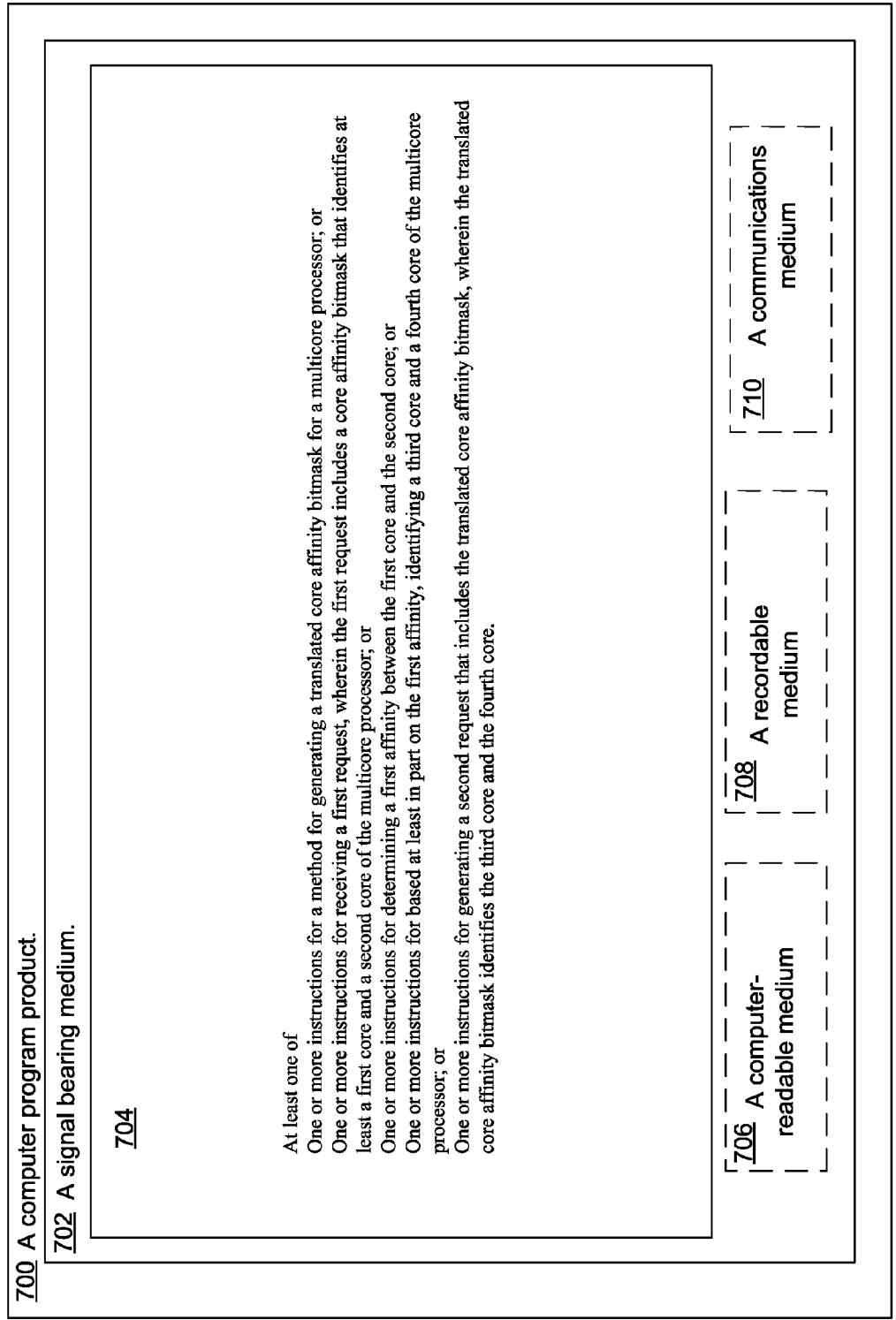
FIG. 7 illustrates a computer program product that can be utilized to implement core affinity bitmask translation.

FIG. 7 illustrates an example computer program product 700 that can be utilized to implement core affinity bitmask translation arranged in accordance with at least some embodiments described herein. Computer program product 700 may include a signal bearing medium 702. Signal bearing medium 702 may include one or more instructions 704 that, when executed by, for example, a processor, may provide the functionality described above with respect to FIGS. 1-6B. Thus, for example, referring to system 100, dispatcher 128 may undertake one or more of the blocks shown in FIG. 7 in response to instructions 704 conveyed to the system 100 by signal bearing medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

FIG. 8 is a block diagram illustrating an example computing device 800 that is arranged to implement core affinity bitmask translation arranged in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor ($\mu$P), a microcontroller ($\mu$C), a digital signal processor (DSP), or any combination thereof. Processor 804 may include dispatcher 128, core affinity translation table 244 and/or bitmask map 246. Processor 804 may include one more levels of caching, such as a level one cache 810 and a level two cache 812, two or more processor cores 814A, 814B, etc., and registers 816. Processor cores 814A, 814B may each include an arithmetic logic unit (ALU), a floating point unit (FPU), a digital signal processing core (DSP Core), or any combination thereof. In a homogeneous configuration, processor cores 814A, 814B may be capable of performing substantially similar functions (e.g. have the same instruction set). In a heterogeneous configuration, processor cores 814A, 814B may be capable of performing different functions (e.g. have different instruction sets). An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a core affinity bitmask translation algorithm 826 that is arranged to perform the functions as described herein including those described with respect to system 100 of FIGS. 1-5. Program data 824 may include core affinity bitmask translation data 828 that may be useful to implement core affinity bitmask translation as is described herein. In some embodiments, core affinity bitmask translation data 828 may include a bitmask map and/or a core affinity classification table. In some embodiments, application 822 may be arranged to operate with program data 824 on operating system 820 such that core affinity bitmask translation algorithm may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a translated core affinity bitmask for a multicore processor, the method comprising, by a dispatcher:
   receiving a first request, wherein the first request includes a core affinity bitmask that identifies at least a first core and a second core of the multicore processor;
   determining that the first core is at least partially inoperative;
   in response to determining that the first core is at least partially inoperative:
      determining that the first core and the second core are both part of a group of cores in a table, wherein the table includes groups of two or more cores and a corresponding affinity between or among the cores in each group;
      identifying an affinity corresponding to the group of cores in the table;
      determining that the identified affinity is an affinity between the first core and the second core;
      based at least in part on the affinity, identifying a third core and a fourth core of the multicore processor;
      generating the translated core affinity bitmask in response to the identification of the third core and the fourth core, wherein the translated core affinity bitmask identifies at least the third core and the fourth core, and wherein the translated core affinity bitmask is different from the core affinity bitmask; and
      generating a second request that includes the translated core affinity bitmask.

2. The method of claim 1, wherein the affinity includes a first affinity, and identifying a third core and a fourth core of the multicore processor comprises determining a second affinity between the third core and the fourth core.

3. The method of claim 2, wherein determining the second affinity between the third core and the fourth core comprises determining that the second affinity is same as the first affinity.

4. The method of claim 1, wherein determining that the first core is at least partially inoperative comprises:
   determining that a current bitmask map of the multicore processor is different from a default bitmask map of the multicore processor.

5. The method of claim 1, wherein identifying the fourth core of the multicore processor comprises identifying the fourth core that is different from the second core.

6. The method of claim 1, further comprising sending a message, wherein the message identifies the third core and the fourth core.

7. A device effective to generate a translated core affinity bitmask of a multicore processor, the device comprising:
   a device processor effective to:
      receive a first request, wherein the first request includes a core affinity bitmask, the core affinity bitmask identifies at least a first core and a second core of the multicore processor;
      determine that the first core is at least partially inoperative;
      in response to the determination that the first core is at least partially inoperative:
         determine that the first core and the second core are both part of a group of cores in a table, wherein the table includes groups of two or more cores and a corresponding affinity between or among the cores in each group;
         identify an affinity that corresponds to the group of cores in the table;
         determine that the identified affinity is an affinity between the first core and the second core;
         based at least in part on the affinity, identify a third core and a fourth core of the multicore processor;
         generate the translated core affinity bitmask in response to the identification of the third core and the fourth core, wherein the translated core affinity bitmask identifies at least the third core and the fourth core, and wherein the translated core affinity bitmask is different from the core affinity bitmask; and
         generate a second request that includes the translated core affinity bitmask.

8. The device of claim 7, wherein the device processor includes a dispatcher.

9. The device of claim 7, further comprising a memory configured in communication with the device processor, wherein:
   the device processor is effective to analyze a current bitmask map stored in the memory to determine that the first core is at least partially inoperative when the current bitmask map is different from a default bitmask map of the multicore processor.

10. The device of claim 7, further comprising a memory configured in communication with the device processor, wherein
    the table is stored in the memory.

11. The device of claim 7, wherein:
    the affinity includes a first affinity;
    the device processor is effective to analyze a table to determine the first affinity between the first core and the second core, where the table includes groups of two or more cores and a corresponding affinity between or among cores in each group; and
    the device processor is effective to analyze the table to determine a second affinity between the third core and fourth core.

12. The device of claim 7, wherein the fourth core is different from the second core.

13. A multicore processor, comprising:
    a first core;
    a second core;
    a third core;
    a fourth core; and
    a dispatcher configured in communication with the first core, the second core, the third core, and the fourth core;
    wherein the dispatcher is effective to:
       receive a first request, wherein the first request includes a core affinity bitmask, the core affinity bitmask identifies at least the first core and the second core of the multicore processor;

determine that the first core is at least partially inoperative;

in response to the determination that the first core is at least partially inoperative:

determine that the first core and the second core are both part of a group of cores in a table, wherein the table includes groups of two or more cores and a corresponding affinity between or among the cores in each group;

identify an affinity that corresponds to the group of cores in the table;

determine that the identified affinity is an affinity between the first core and the second core;

based at least in part on the affinity between the first core and the second core, identify a third core and a fourth core of the multicore processor;

generate the translated core affinity bitmask in response to the identification of the third core and the fourth core, wherein the translated core affinity bitmask identifies at least the third core and the fourth core, and wherein the translated core affinity bitmask is different from the core affinity bitmask; and generate a second request that includes the translated core affinity bitmask.

14. The multicore processor of claim 13, wherein the first request and second request include instructions to be executed by the multicore processor.

15. The multicore processor of claim 13, further comprising a memory configured in communication with the first core, the second core, the third core, the fourth core, and the dispatcher, wherein the dispatcher is effective to analyze a current bitmask map in the memory to determine that the first core is at least partially inoperative when a current bitmask map is different from a default bitmask map of the multicore processor.

16. The multicore processor of claim 13, wherein:
the affinity includes a first affinity; and
the dispatcher is effective to analyze the table to determine a second affinity between the third core and fourth core.

17. The multicore processor of claim 13, wherein the fourth core is different from the second core.

18. A method to generate a translated core affinity bitmask for a multicore processor, the method comprising, by a dispatcher:

receiving a first request to execute a first task on a first core and a second task on a second core, wherein the first request includes a core affinity bitmask that identifies at least the first core and the second core of the multicore processor;

determining a property of the first core;

determining that the first core is at least partially inoperative;

in response to determining that the first core is at least partially inoperative:

determining that the first core and the second core are both part of a group of cores in a table, wherein the table includes groups of two or more cores and a corresponding property between or among the cores in each group;

identifying a property corresponding to the group of cores in the table;

based on the determination that the first core is at least partially inoperative, and based on the identified property, identifying a third core of the multicore processor, wherein the third core has the property;

generating the translated core affinity bitmask in response to the identification of the third core, wherein the translated core affinity bitmask identifies at least the second core and the third core so that the first task is executed on the third core and the second task is executed on the second core, and wherein the translated core affinity bitmask is different from the core affinity bitmask; and generating a second request that includes the translated core affinity bitmask.

19. The method of claim 18, wherein determining that the first core is at least partially inoperative comprises:

determining that a current bitmask map of the multicore processor is different from a default bitmask map of the multicore processor.

* * * * *

UNITED STATES PATENT AND TRADEMARK OFFICE
CERTIFICATE OF CORRECTION

PATENT NO. : 9,311,153 B2
APPLICATION NO. : 14/124569
DATED : April 12, 2016
INVENTOR(S) : Kruglick Page 1 of 1

It is certified that error appears in the above-identified patent and that said Letters Patent is hereby corrected as shown below:

On the Title Page, Item (71), delete "Wilmington (DE)" and insert -- Wilmington, DE (US) --, therefor.

In the specification

Column 1, Line 2, below "Title", insert -- CROSS-REFERENCE TO RELATED APPLICATION --.

Column 1, Line 4, delete "§371" and insert -- § 371 --, therefor.

Signed and Sealed this
Fifth Day of July, 2016

Michelle K. Lee
*Director of the United States Patent and Trademark Office*